(12) United States Patent
Bhattacharyay et al.

(10) Patent No.: US 7,199,804 B2
(45) Date of Patent: Apr. 3, 2007

(54) INK INFORMATION IN IMAGE FILES

(75) Inventors: Subha Bhattacharyay, Bellevue, WA (US); Alexander Gounares, Kirkland, WA (US); Alexander J. Kolmykov-Zotov, Sammamish, WA (US); Andrew Silverman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 10/143,832

(22) Filed: May 14, 2002

(65) Prior Publication Data

US 2003/0214515 A1 Nov. 20, 2003

(51) Int. Cl.
*G06F 3/033* (2006.01)
*G09G 5/00* (2006.01)

(52) U.S. Cl. .................. 345/619; 345/179; 345/546
(58) Field of Classification Search ................ 345/619, 345/629, 179, 634, 636, 630, 546; 715/512
See application file for complete search history.

(56) References Cited

U.S. PATENT DOCUMENTS

| 4,727,588 | A | | 2/1988 | Fox et al. |
| 4,847,604 | A | * | 7/1989 | Doyle .................. 345/180 |
| 5,331,431 | A | | 7/1994 | Jasinski |
| 5,596,350 | A | * | 1/1997 | Capps et al. .............. 345/179 |
| 6,300,959 | B1 | | 10/2001 | Gabler et al. |
| 6,304,898 | B1 | | 10/2001 | Shiigi |
| 6,564,249 | B2 | | 5/2003 | Shiigi |
| 6,850,228 | B1 | * | 2/2005 | Parks et al. .............. 345/179 |
| 2002/0013795 | A1 | * | 1/2002 | Dresevie et al. ........... 707/541 |
| 2002/0049787 | A1 | * | 4/2002 | Keely et al. ............. 707/512 |
| 2003/0053084 | A1 | * | 3/2003 | Geidl et al. .............. 358/1.6 |

OTHER PUBLICATIONS

Cheong S. Ang, M.S.*, Peter Brantley, M.A., Michael D. Doyle, PhD., Polymap: A Versatile Client-Side Image Map for the Web, Proceedings of the Fourth WWW Conference at Boston, Dec. 1995, pp. 1-13.*

Freehafer, N., "Microsoft Office XP: Handwriting Recognition in Office XP" Microsoft Product Support Services White Paper, XX, XX, Jun. 30, 2001, pp. 1-11, XP002278660 *p. 7.

Guyon, I et al.: "Unipen Project of On-line 1-18 Data Exchange and Recognizer Benchmarks" Pattern Recognition, 1994. vol. 2—Conference B: Computer Vision & Image Processing, Proceedings of the 12th IAPR International Conference on Jerusalem, Israel Oct. 9-13, 1994, Los Alamitos, CA, USA, IEEE Comput. Soc., Oct. 9, 1994, pp. 29-33, XP010216248, ISBN: 0-8186-6270-0 *the whole document.

(Continued)

*Primary Examiner*—Jeffery A. Brier
(74) *Attorney, Agent, or Firm*—Banner & Witcoff, Ltd.

(57) ABSTRACT

Association of ink information with image files is described. An image file is created and ink information is parsed and inserted into comment or arbitrary data fields of the image file. The image file with additional ink information may be used by both ink-enabled applications/environments and non-ink-enabled applications environments. The ink-enabled applications/environments may extract the ink information and use the original ink while the non-ink-enabled applications/environments may use the image information to permit the end user to see the visual representation of the ink.

13 Claims, 8 Drawing Sheets

OTHER PUBLICATIONS

Vuurpijl, L. and Schomaker, L., "Uptools" 'Online!, Nov. 14, 1997, XP002305708, Retrieved from the Internet: URL: http//hwr.nici.kun.nl/unipen/uptools3/> retrieved on Nov. 15, 2004! *overview* *uni2animgif* *unipen2eps* *upworks.

Jaeger, S. et al., "Two On-line Japanese Character Databases in Unipen Format" Proceedings of Sixth International Conference on Document Analysis and Recognition IEEE Comput. Soc. Los Alamitos, CA, USA, Sep. 2001, pp. 566-570, XP002305709, ISBN: 0-7695-1263-1 *section 1* *section 5* *p. 566.

Huttenlocher et al., "On Digipaper and The Dissemination of Electronic Documents" D-LIB Magazine, 'Online! vol. 6, No. 1, Jan. 2000, XP00230570, retrieved from the Internet: URL:http://www.dlib.org/dlib/january00/moll/01moll.html> retrieved on Nov. 15, 2004! *section mixed raster content model* *section color token compression.

* cited by examiner

|  | GIF | JPEG | PNG | PDF/Postscript |
|---|---|---|---|---|
| Comment Field/Arbitrary Data | Yes | Yes | Yes | Yes |
| Transparency (Multiple Levels) | Yes (1 bit) | No | Yes (Whole Channel) | Yes |
| High Graphics Fidelity | 8 bit | Yes | Yes | Yes |
| Compression | Lossless & Lossy | Lossy | Lossless & Lossy | Lossless |

INK INFORMATION IN IMAGE FILES

BACKGROUND

1. Technical Field

This disclosure relates to the conveyance of information in image files. More particularly, this disclosure relates to the use of image files to store supplemental information relating to electronic ink.

2. Related Art

Typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

With the increasing ability to exchange information over the internet, users will desire to exchange electronic ink for various purposes. For example, one may draw a picture in a drawing program and send the resulting image to another. If both users are using the same drawing package, then the person receiving the image may have the ability to modify or reuse the transmitted image. However, if the person receiving the image does not have the drawing package, that person may not be able to view the transmitted image. Further, if there were a prior agreement between the users to use a standard file format, the sender would be relegated to save the image in the predetermined file format. If multiple users are part of a distribution list, the sender must save the image file in as many file formats as needed to permit each of the users to view the file. However, only those who received the file in the original file format would generally be permitted to interact with or modify the image.

In the electronic ink realm, no common ability exists to permit one to transmit electronic ink to all users and have all users being able to at least view the electronic ink regardless of the capabilities of the users' system while permitting more powerful users with the ability to use the original electronic ink.

SUMMARY

Aspects of the present invention address one or more of the issues raised above. Aspects of the present invention permit electronic ink to be conveyed by use of an image file or files in which a graphical representation of the ink is stored as the image or images and information relating to the electronic ink is stored in one or more additional fields or comment sections. For non-ink-enabled applications, the end user may be provided with the ability to see the image of ink, thereby receiving the visual information associated with the ink strokes. For ink-enabled applications, an end user may be provided with the original ink and its associated richness of properties and other information.

These and other aspects are addressed in relation to the Figures and related description.

BRIEF DESCRIPTION OF THE DRAWINGS

The foregoing summary of aspects of the invention, as well as the following detailed description of various embodiments, is better understood when read in conjunction with the accompanying drawings, which are included by way of example, and not by way of limitation with regard to the claimed invention.

DETAILED DESCRIPTION OF THE DRAWINGS

Aspects of the present invention relate to the storage of electronic ink as an image file with supplementary information. Individuals receiving the image file and supplementary information may view the image and/or the electronic ink as reconstructed from the supplementary information as their system or applications permit.

To assist the reader, the following description is divided into sections as follows: characteristics of ink; terms; general purpose computer; use of image files with ink information; creation of image files with ink information; and retrieving stored ink information.

Characteristics of Ink

Electronic ink (or ink) refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, electronic ink may additionally store ink strokes and properties associated with the ink strokes to more fully render ink. Ink may be stored as a series of strokes and a series of properties. In other situations, ink may be stored with a complex series of properties in which the properties have properties of their own. Properties of the ink may include, for example, color, width, pressure between the stylus and tablet, and angle between the stylus and tablet, and pen shape and the like. While these properties may suffice for many applications, electronic ink is extensible to include custom properties (and other data) generated by additional applications. All strokes and values may be stored directly with excess information. However, alternative versions of ink reflect considerations that eliminate excess information when possible or practicable so as to minimize the physical size of the stored ink.

The properties used to define an ink object and the strokes within the ink object may have varying scope. For example, some properties may apply to all ink strokes in an ink object (e.g., the shape of a pen tip). Other properties may relate only to a specific point (e.g., a point at which a stylus starts a stroke). Others may relate to specific strokes while others may relate to packets of information as reported by hardware (e.g., coordinates, pressure, angle of pen, the intervals of time between reported coordinates, and the like). In short, properties have different levels of scope.

To efficiently store properties, some may be explicitly specified while others may be implicit. In a simple example, all properties may be default properties and not specified in an ink object. So, the ink object may only have X and Y coordinate values. In another example, the ink object may have properties that affect the entire ink object but the properties are specified in the ink object. In a third example, some strokes may have a first set of properties and others have a second set of properties. The properties may be defined initially at the beginning of the ink object and the individual strokes may reference the previously defined properties as needed. Using this approach of defining properties then later referencing the properties promotes a greater efficiency in storing properties. This becomes more apparent as an ink object becomes larger as the number of properties increases and the number of ink strokes referencing the properties increases.

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof Stream—A sequence of strokes that may or may not include properties that comprises a data structure.

Ink object—A data structure storing a stream of ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General Purpose Computer

Figure 1:
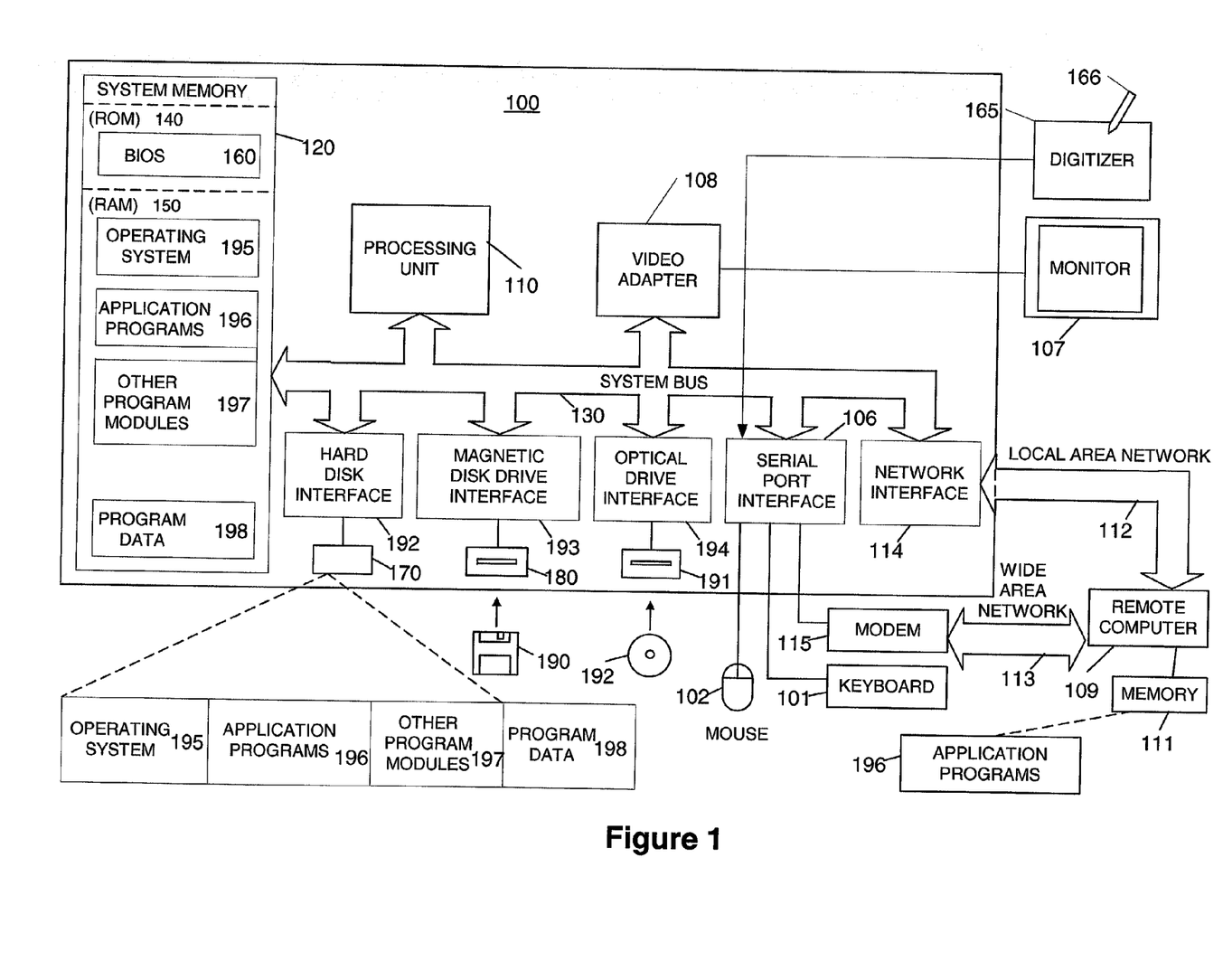
FIG. 1 shows a schematic diagram of a general-purpose digital computing environment that can be used to implement various aspects of the invention.

FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In some embodiments, a pen digitizer 165 and accompanying pen or stylus 166 are provided in order to digitally capture freehand input. Although a connection between the pen digitizer 165 and the serial interface port 106 is shown, in practice, the pen digitizer 165 may be coupled to the processing unit 110 directly, via a parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used.

The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Use of Image Files with Ink Information

Figure 2:
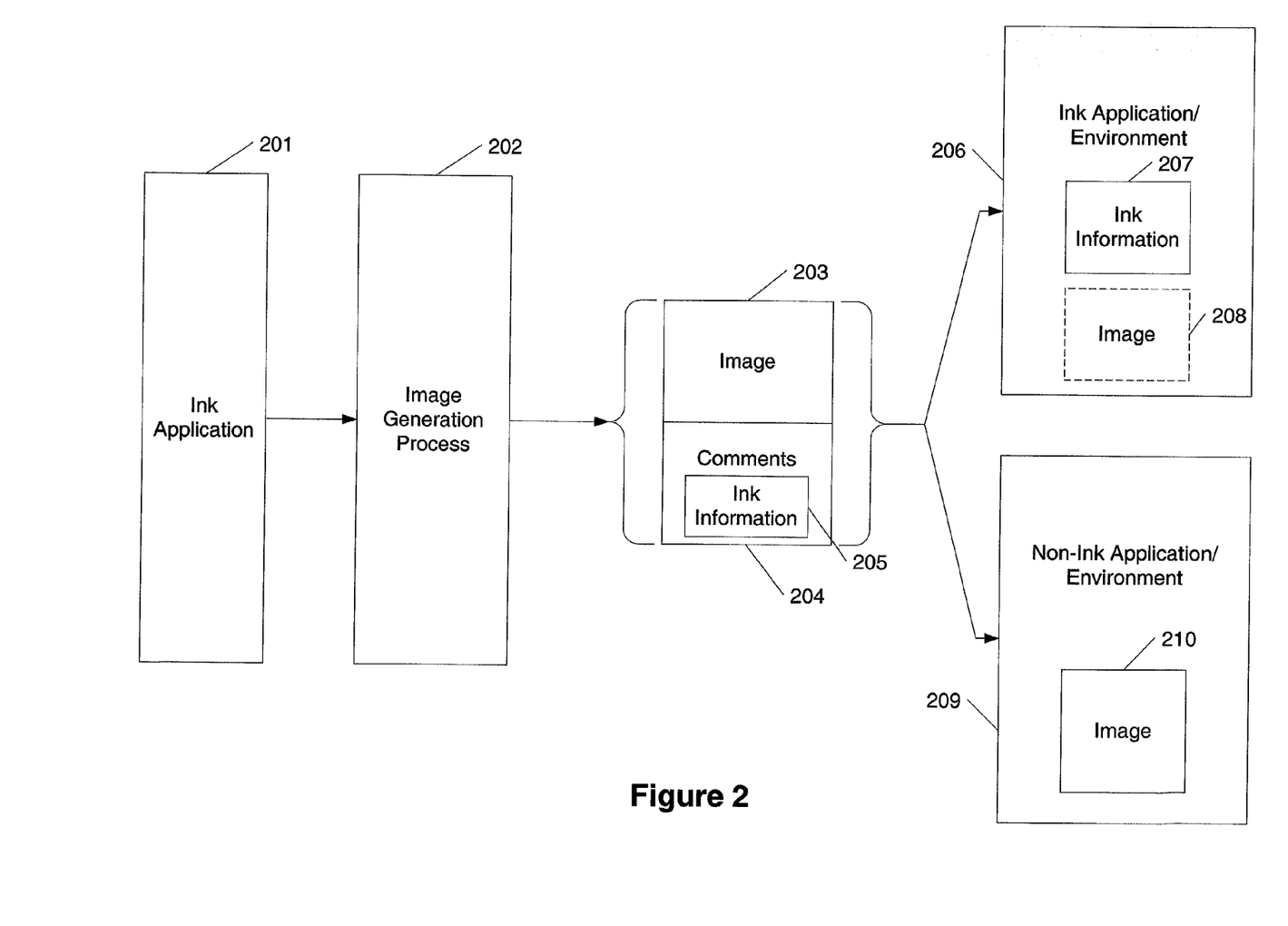
FIG. 2 shows a process for creating an image file or files having additional information stored in them and their subsequent use in accordance with various aspects of the invention.

FIG. 2 shows a process for creating an image file or files having additional information stored in them and their subsequent use in accordance with various aspects of the invention. An application or environment that permits the creation of ink is shown as ink application 201. Next, an image representing the visual information of the ink is created in image generation process 202. Process 202 may be part of application 201 or may be separately called from application 201. The output of process 202 is the image file 203 with ink information 205 stored in association with the image file 203. The ink information 205 may be, as shown in FIG. 2, stored in the comment field 204 of the image 203, or may be associated with the image 203.

The combination of image 203 and ink information 205 may be transmitted to various receiving applications or environments. Some of these applications or environments may have the ability to read and use the stored ink information 205 while others may not.

The applications or environments that have the ability to make use of at least some of the ink information 204 are shown as environment 206. Here, ink information 207 is used in the application or environment 206. The additional image information may or may not be used as shown by broken box 208. For example, the image information may be discarded to reduce the size of the information associated with the received ink information. Alternatively, the image 208 may be maintained so as to permit additional functionality to the end user. For instance, the image 208 may be maintained for use as a thumbnail image or a preview image of the received ink.

For non-ink-enabled applications or environments 209, the image 210 is used. The ink information 205 may remain attached to the image 210 in the application/environment 209 or may be removed. The application/environment 209 may not be able to understand the ink information 205 associated with the image 210 and may ignore it or delete it.

Examples of applications that may or may not be able to use the ink information 205 include word processing, email, spreadsheet, database, note taking, project management, calendaring and other related applications. Further, not all applications need to be enabled on their own to use the ink as the functionality to use the ink information may reside in the environment (e.g. operating system or link to an application that permits the functionality to be ported to another application).

Figure 3:
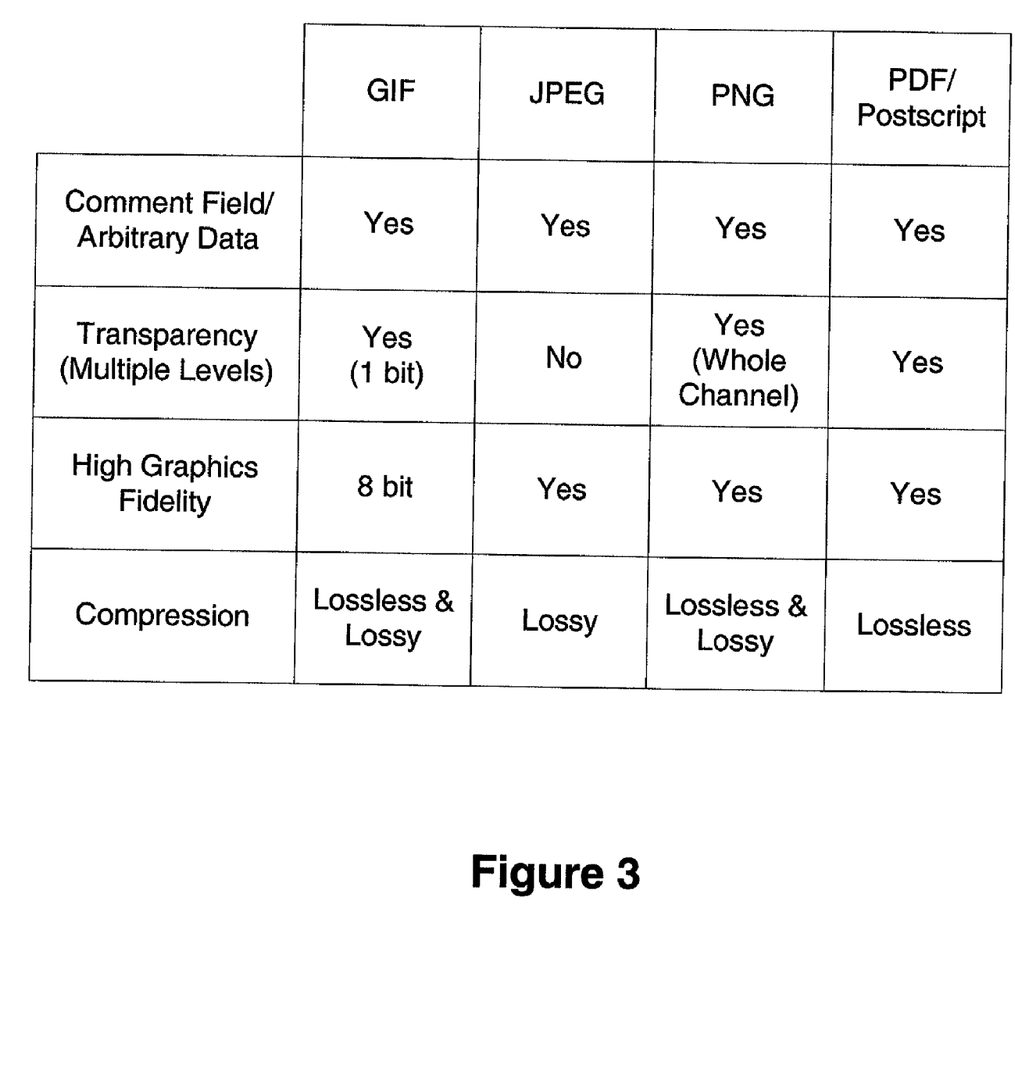
FIG. 3 shows various image file formats and associated information in accordance with various aspects of the present invention.

FIG. 3 shows a number of sample image file formats. It is appreciated that other image file formats may be used. The provided sample image file formats are useful as they have a comment field. The comment field provides the ability for a single file to be transmitted to other applications or environments. However, it is appreciated that other image file formats that do not have comment fields may be used by associating ink information with them and transmitting the image file and the associated ink.

FIG. 3 includes listings for GIFs, JPEGs, PNGs, and PDF/Postscript image files. All four image files have a comment field or permit arbitrary data. For purposes of this application, the inclusion of arbitrary data is enveloped in the reference to the comment field. All but JPEGs have transparency. GIFs have a 1 bit transparency while PNGs may use an entire channel for transparency. JPEGs, PNGs, and PDF/Postscript files have high graphics fidelity while GIFs only include 8 bit color depth. Finally, GIFs and PNGs may have lossy or lossless compression. JPEGs have lossy compression while PDF/Postscript files have lossless compression.

A variety of other extensibility mechanisms may be used to include ink information. GIFs have application extension blocks, for example. Other file formats may contain additional places where ink information may be stored. GIFs are provided as an example but are not considered limiting. For example, one may place ink information after the end of a termination block of an image. Or, for example, the image palate itself may serve as a medium for storing ink information. For instance, multiple entries may be stored in a palate of the same color and using the image bits to store the ink.

Creation of Image Files with Ink Information

The following describes processes for creating image files with associated ink information. It is appreciated that the various processes may be run concurrently or sequentially. Further, the order may be altered as needed. Finally, some steps may be eliminated or combined with other steps to minimize processing time.

Figure 4:
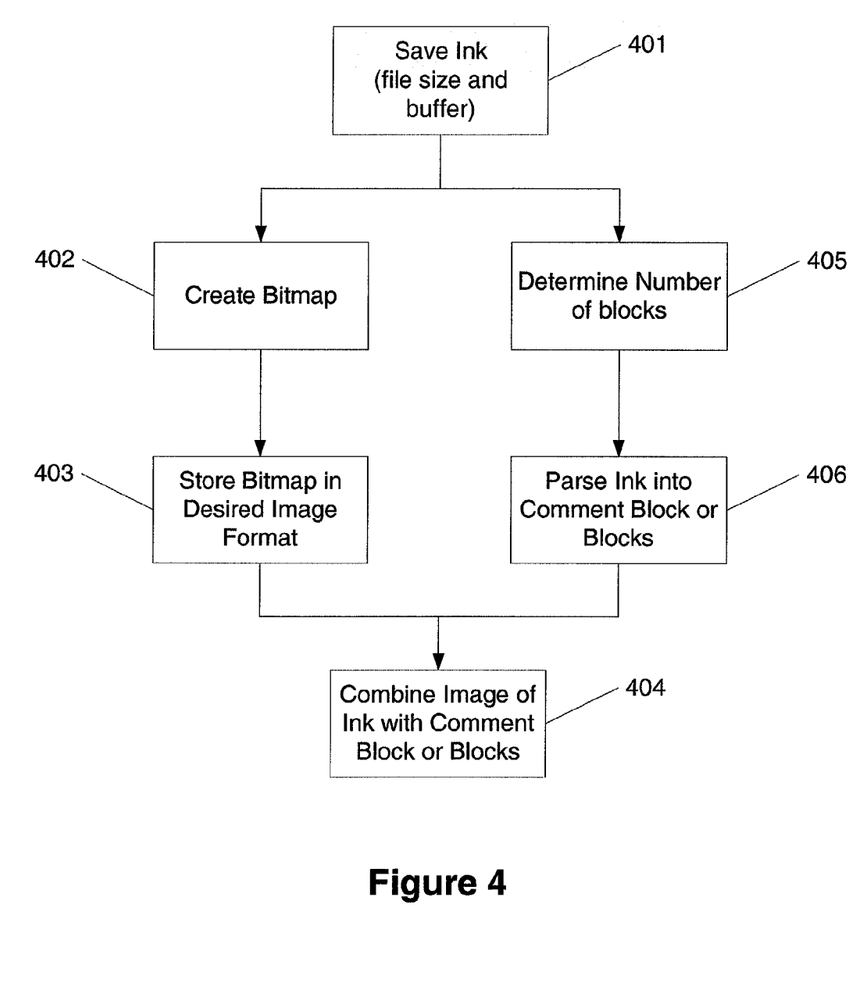
FIG. 4 shows an example of a process for creating image files with associated ink information in accordance with embodiments of the present invention.

FIG. 4 shows an example of a process for creating image files with associated ink information in accordance with embodiments of the present invention. In step 401, the system receives a request to save ink. The request to save may be a special save command in which ink is directly indicated to be made portable to a variety of applications or environments. Alternatively, the save request may be a generic save request in which all save operations store ink information in associate with an image file.

The request to save ink in step 401 may also include an identifier of the ink. It may relate to the ink object, ink strokes, multiple ink objects, multiple strokes, and the like. The request to save 401 may also include the file size of the ink. Further, if the ink is in the system's memory, the request may include the buffer contents.

In step 402, a bit map is created representing the visual form of the ink. In step 403, the bitmap is converted into a desired image format (for example, those mentioned above).

Comment fields may have a set size for each field, may be capped, or may have an unlimited size. For the unlimited size example, the ink object (or other ink information) may be placed in the comment field. For the capped or set size examples, the comment fields may be separated in terms of the set size blocks. Thus, for information sets of less than the capped block size, only one block may be used. The actual size of the block may be the size of the information or the full size of the block. In examples, where multiple blocks are to be used, all blocks but the last block may be the full size of the set size block with the last block being either smaller than the set size block or the full size of the capped size. In step 405, the number of blocks needed to store the ink object (or other ink information) is determined. Next, in step 406, the ink is parsed in to the comment block or comment blocks.

Finally, in step 404, the image of the ink from step 403, is combined with comment block or blocks from step 406, resulting in an image file with ink information.

Alternatives to those set forth above include combining steps 402 and 403 to skip the creation of a bit map image and using only one comment block of variable size to encase the desired ink information instead of steps 405 and 406.

Figure 5:
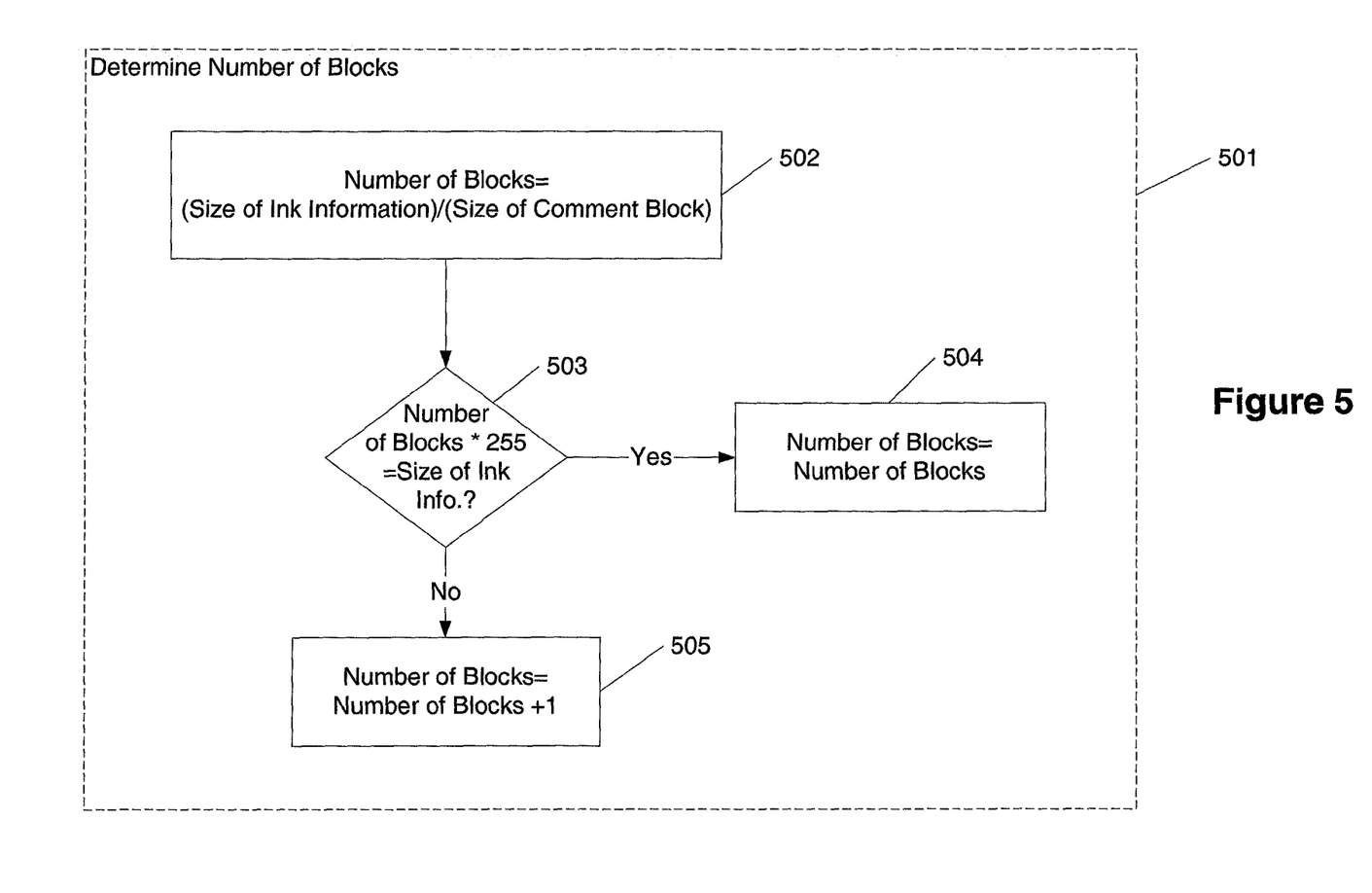
FIG. 5 shows an example of a process of determining the number of blocks for storing electronic ink information in accordance with embodiments of the present invention.

FIG. 5 shows an example of a process of determining (501) the number of blocks for storing electronic ink information in accordance with embodiments of the present invention. In one environment, one may want to store the ink information in the comment section of a GIF file. The GIF comment fields are arranged in blocks of 256 bytes each. The following description is one example of how one may store ink information in the comment fields of a GIF. It is appreciated that variations are possible and considered within the scope of this example.

In step 502, the number of blocks needed to store the ink information is approximated by dividing the size of the ink information by the size of each block. Here, for example, the size of each comment block for a GIF is 256 bytes. One header byte (for example, "0x21") may be used to indicate that the following is a comment block. One byte is used to specify the size of the comment block. It is appreciated that other content may specify the following is a comment block in other situations. This leaves 255 available bytes. In other examples, two or more bytes may be used to specify the size of the comment block with the resulting available space for the ink information increasing.

Next, the exact number of blocks needed to store the ink information is accomplished in steps 503–505. In step 503, a check is made whether the number of blocks (in whole blocks) from step 502 times 255 equals the size of the original ink information. If yes, then the number of blocks from step 502 is kept in step 504, otherwise the number of blocks needed to store the ink information is incremented in step 505. In other examples, this check may be eliminated by rounding up all results from step 502 or by simply adding one block to the number of blocks needed from step 502 and eliminating any left over fraction of a block.

Figure 6:
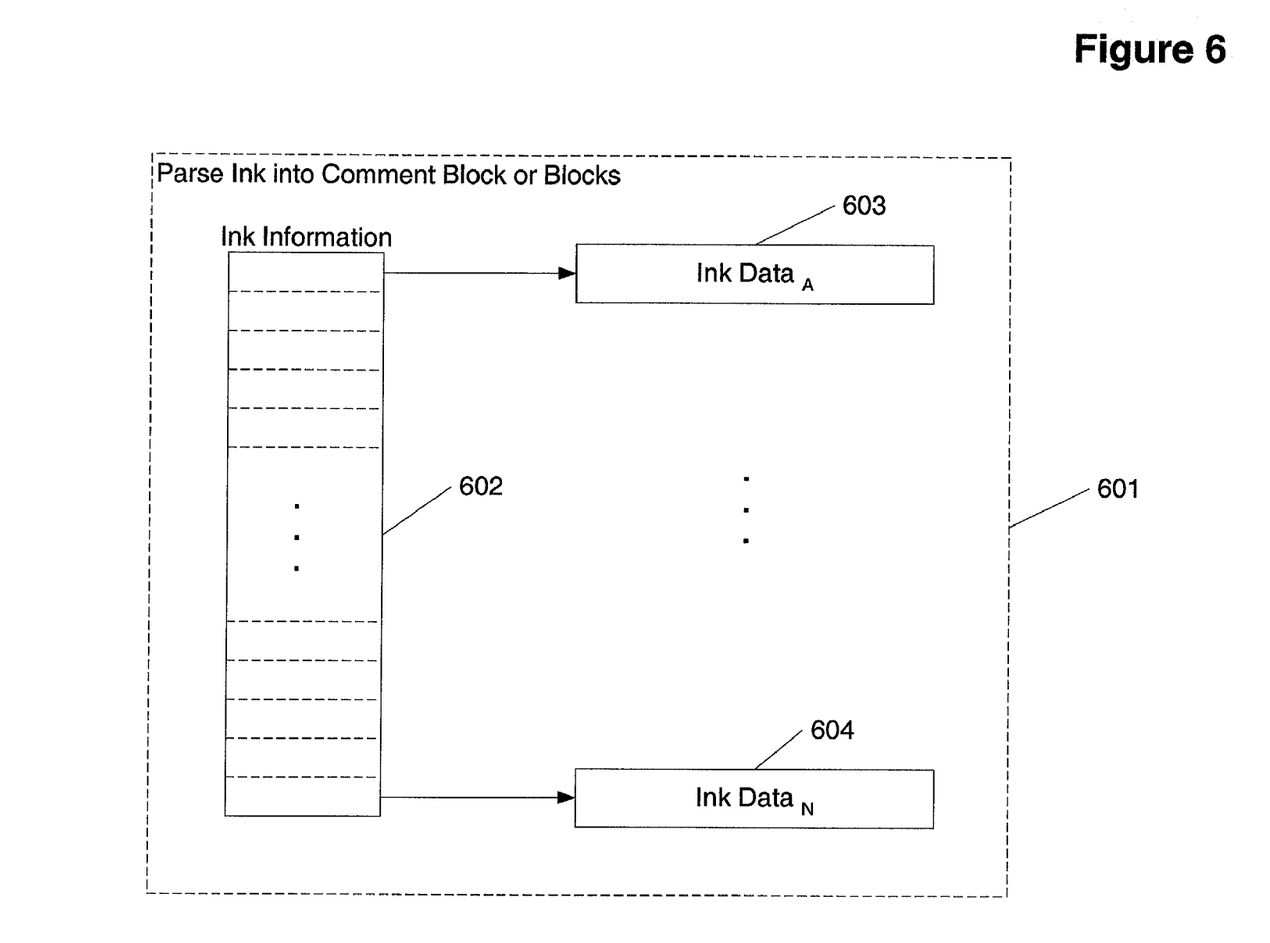
FIG. 6 shows an example of ink information being parsed in to comment blocks in accordance with embodiments of the present invention.

FIG. 6 shows an example of ink information being parsed by process 601 into comment blocks in accordance with embodiments of the present invention. Ink information 602 is divided into blocks of 255 bytes each. The system then walks through the ink information 602 and writes the information into bytes 1 through 255 (totaling 255 bytes) of each comment block. For example, the first block 603 is represented as containing ink data$_A$ and the last block 604 is represented as containing ink data$_N$. The ink information parsed may be a portion or all of the original ink.

In an alternative example to FIGS. 5 and 6, the ink information may be divided by 254 where the size of each comment block is specified in each comment block. So, the resulting structure would be the identifier of the comment block (byte 0), the size of the comment block (byte 1), then the ink information (bytes 2–255).

Figure 7:
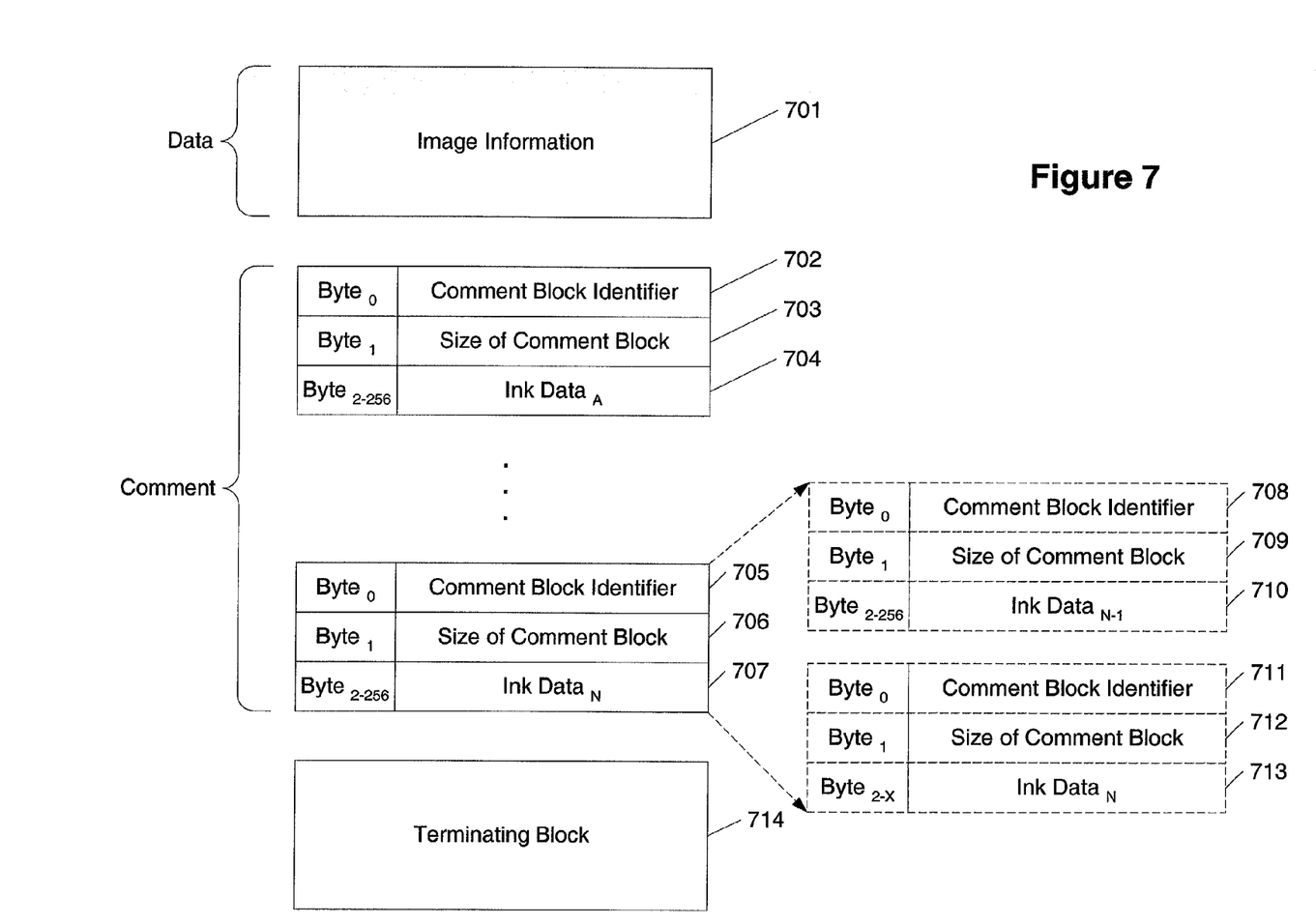
FIG. 7 shows various examples of comment blocks storing ink information in accordance with embodiments of the present invention.

FIG. 7 shows various examples of comment blocks storing ink information in accordance with embodiments of the present invention. The final data storage of step 404 combines the image information (data) represented as 701 with the comment blocks 702–713. Finally, a terminating block 714 is appended to the data structure. The terminating block may be eliminated in various instances, for example, when the size of the image file with associated information is known. In this example, the system may then know when it has reached the end of the ink information in the image file. This may be advantageous when non-ink enabled applications want to skip quickly past ink information in the comment blocks.

Various examples of comment blocks are shown in FIG. 7. The first comment block is represented by bytes 702–704 in which byte 0 is the comment block identifier 702, byte 1 is the size of the comment block 703, and bytes 2–256 are the ink data$_A$ 704. In another embodiment, the size of the ink block may be eliminated and the number of bytes available for storage increases from 255 to 256.

The last comment block is shown by bytes 705–705. Byte 0 is the comment block identifier 705, byte 1 is the size of the comment block 706, and bytes 2–256 is the ink data$_N$ 707. The last comment block 705–707 may be used where the size of each comment block is fixed or where the ink information fills up all space in the last comment block. If the ink information does not completely fill the last comment block, the alternative representation of bytes 708–713 may be used.

Byte 0 represents the comment block identifiers 708 and 709. Byte 1 represents the size of the comment block 709 and 712. Bytes 2–256 represent ink data$_{N-1}$ 710 and bytes 2–X represent the remaining ink data$_N$ where less than all available bytes (2–256) are needed to store the last block of ink.

Finally, terminating block 714 is added to indicate the end of the comment section and or the end of the image file with the ink information.

Further, the comment block identifier tag may be eliminated when the comments blocks are ordered to follow each other. The following example is provided for ink information totaling 260 bytes in which only one comment block identifier is used. 260 is larger than the 255 comment block size so two comment blocks may be used. The first comment block may be arranged as follows:

| Byte Number(s) | Content | Description |
| --- | --- | --- |
| Byte 0 | 0x21 | Comment Block Identifier |
| Byte 1 | 0xFF | Size of Ink Data (255 Bytes) |
| Bytes 2–256 | Contents of Ink Data | Contents (Bytes 1–255) |
| Byte 257 | 0x05 | Size of Ink Data (5 Bytes) |
| Bytes 258–262 | Content of Ink Data | Contents (Bytes 256–260) |
| Byte 263 | 0x00 | Terminator Block Size |

It is appreciated that other modifications may be used as described above including but not limited to eliminating or increasing the size designator for the comment block and the like.

FIGS. 8A–8E show various examples of data structures associated with image information and comment blocks in accordance with embodiments of the present invention. In short, any variety of combinations of the image information and the comment fields may be used.

Figure 8A:
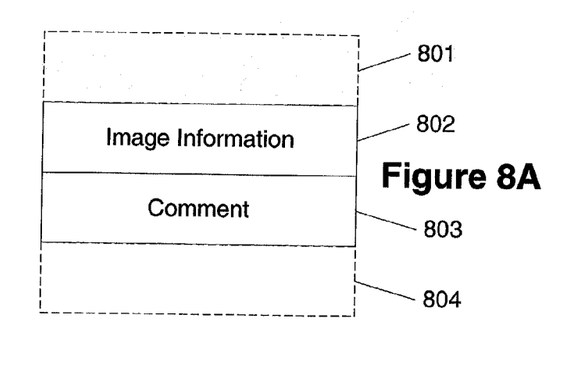
FIGS. 8A–8E show various examples of data structures associated with image information and comment blocks in accordance with embodiments of the present invention.
Figure 8B:
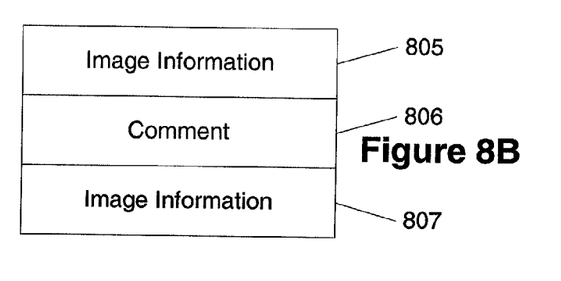
Figure 8C:
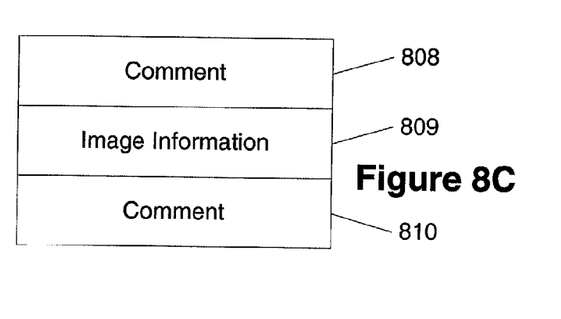
Figure 8D:
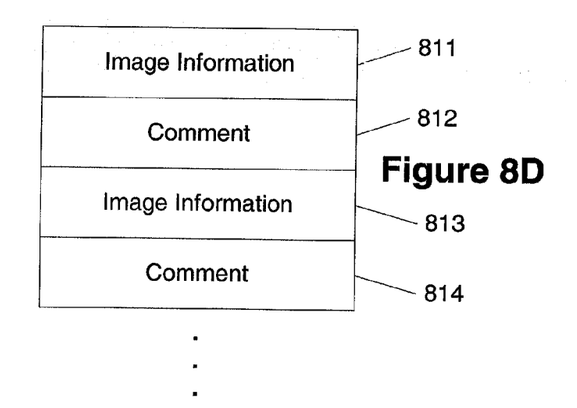
Figure 8E:
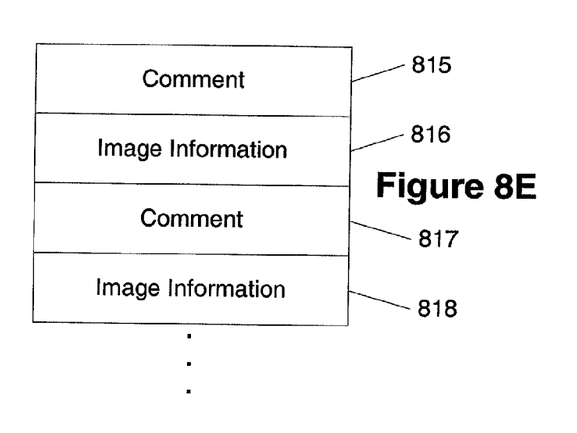

FIG. 8A shows image information 802 and comment section 803 alone or bounded by additional information 801 and 804 (shown in broken boxes). FIG. 8B shows an example where the image information sections 805 and 807 are split by the comment field 806. FIG. 8C shows the comment fields 808 and 810 split by the image information field 809. FIG. 8D shows alternating occurrences of image information sections 811 and 813 with comment sections 812 and 814. FIG. 8E shows the converse of FIG. 8D with alternating sections of comment fields 815 and 817 with image information sections 816 and 818.

Retrieving Stored Ink Information

Upon receipt of the image file with ink information, an ink-enabled application or environment sniffs the image file to determine if it contains any ink information. The ink information may be identified by a header value in one of the comment fields that alerts the application/environment that ink information is stored in the image file.

Once the ink information has been found, the ink-enabled application/environment extracts the ink information and reassembles the ink information into an ink object, an OLE object, or an enhanced metafile.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

We claim:

1. A process for creating an image file with ink data comprising the steps of:
   creating at least one image from ink data, wherein said image is a displayable version of said ink data;
   comparing a data size of said ink data with a block size of available space in an image format;
   determining, based on a result of said comparing, how said ink data will be distributed across two or more blocks in said image format; and
   combining, in an image file and in accordance with a result of said step of determining, said image with at least a portion of said ink data, wherein said image file includes two or more blocks containing portions of said ink data, and each of said blocks includes a size value identifying an amount of ink data contained in said block.

2. The process according to claim 1, wherein said creating at least one image step further comprises:
   creating a bitmap image from said ink data.

3. The process according to claim 2, wherein said creating at least one image step further comprises:
   converting said bitmap image into another image format.

4. The process according to claim 1, wherein said combining step further comprises:
   placing at least one of said two or more blocks of data in a comment field of said at least one image.

5. The process of claim 1, wherein the ink data has a plurality of strokes, the step of combining including combining the image with at least one of the strokes.

6. The process of claim 1, wherein the step of combining includes combining the image with the at least the portion of the ink data to result in a JPEG, GIF, PNG, or PDF file containing both the image and the at least the portion of the ink data.

7. The process of claim 1, wherein said block size of available space in said image format is a capped block size, and said step of combining results in said image file including a block containing data for said ink data and having a size smaller than said capped block size.

8. The process of claim 1, wherein said block size of available space in said image format is a set size.

9. The process of claim 1, wherein said two or more blocks are of equal size.

10. A process for reconstructing ink comprising the steps of:
    receiving a file, the file having image data for an image of ink data and a plurality of comment fields holding said ink data, wherein at least two of said comment fields have different amounts of data for said ink data, and each field contains size information identifying an amount of ink data contained in said field;
    determining if said ink data is usable; and
    generating a display of said image, where said display is generated using said ink data and not said image data if said ink data is determined to be usable, and using said image data and not said ink data if said ink data is determined to not be usable.

11. The process according to claim 10, further comprising the step of:
    extracting said ink data and saving said extracted ink data as an object responsive to determining that said ink data is usable.

12. The process according to claim 10, further comprising the step of:
    extracting said ink data and saving said extracted ink data as an enhanced meta file responsive to determining that said ink data is usable.

13. A process for viewing ink data comprising the steps of:
    receiving a file of an image, said file containing a visual representation of ink data, and further containing ink data in at least three comment fields of said image file, where two of said comment fields have a common amount of data for said ink data, and a third of said comment fields has a different amount of data for said ink data;
    extracting stroke characteristic data from said ink data, said stroke characteristic data identifying a speed, pressure, or angle of a stylus used to create said ink data; and
    using said stroke characteristic data to display said image to a user.

* * * * *